(12) United States Patent
Agam (10) Patent No.: US 10,988,934 B2
(45) Date of Patent: Apr. 27, 2021

(54) DEVICE FOR PROTECTING OF PASSAGES FOR UTILITIES FROM ENTRY OF OUTDOOR WEATHER ELEMENTS OF ADVERSE EFFECTS

(71) Applicant: Ido Agam, Kiryat Tivon (IL)

(72) Inventor: Ido Agam, Kiryat Tivon (IL)

( * ) Notice: Subject to any disclaimer, the term of this patent is extended or adjusted under 35 U.S.C. 154(b) by 0 days.

(21) Appl. No.: 16/603,941

(22) PCT Filed: May 9, 2017

(86) PCT No.: PCT/IL2017/000003
§ 371 (c)(1),
(2) Date: Oct. 9, 2019

(87) PCT Pub. No.: WO2018/207167
PCT Pub. Date: Nov. 15, 2018

(65) Prior Publication Data
US 2020/0115907 A1    Apr. 16, 2020

(51) Int. Cl.
*E04D 13/14* (2006.01)
*H02G 3/22* (2006.01)
*E04D 13/147* (2006.01)

(52) U.S. Cl.
CPC ........... *E04D 13/1476* (2013.01); *H02G 3/22* (2013.01)

(58) Field of Classification Search
CPC ... E04D 13/14; E04D 13/143; E04D 13/1473; E04D 13/1476; E04D 13/1407; E04D 13/17; H02G 3/22
(Continued)

(56) References Cited

U.S. PATENT DOCUMENTS 222,939 A    12/1879  Pardessus
358,262 A *   2/1887  Griffin ................ E04D 13/1476
                                                        285/43
(Continued)

FOREIGN PATENT DOCUMENTS

DE    4003906 A1    10/1990
DE    19959591 A1    6/2000
(Continued)

OTHER PUBLICATIONS

Machine Translation of EP2492411A2, https://translationportal.epo.org/emtp/translate/?ACTION=description-retrieval&COUNTRY=EP&ENGINE=google&FORMAT=docdb&KIND=A2&LOCALE=en_EP&NUMBER=2492411&SRCLANG=de&TRGLANG=en (Year: 2020).*

(Continued)

*Primary Examiner* — Ryan D Kwiecinski
(74) *Attorney, Agent, or Firm* — Dorsey & Whitney LLP (57) ABSTRACT

The present invention is a reliable and simple to install device for protecting of passages for utilities in roof structures from the entry of adverse effect outdoor weather elements. The device is composed of: a flexible tube component (FTC), a surface insertion tube component (SITC), a surface connection plate component (SCPC) and a SCPC-connecting paste component. FTC is composed of a hollow semi-flexible tube having one side unconnected and the other side firmly connected to the SITC, forming a continuous tube. The SITC is composed of a rigid hollow tube divided into two portions by the SCPC. The SCPS is composed of a perforated, rigid material, perpendicularly fixated to and around the SITC, In installing the device of the present invention, the SCPC-connecting paste component is smeared on the external surface of a roof structure surrounding the passage for utilities. The unconnected side of SITC is inserted into the passage for utilities till the SCPC is (Continued)

tightly pressed into the SCPC-connecting paste component. The SCP is pressed until the SCPC-connecting paste component oozes through the perforated plate of the SCPC. Upon drying and hardening of the SCPS connecting paste component, the SCPS is fixated and the device is stabilized. After the device is fixed and stabilized the FTC is stretched and bent in an approximately 180 degree angle so as to have the unconnected opening of the FTC approximately aligned in parallel with, and facing the external surface of, a roof structure surrounding of the passage for utilities. Either after the bending of FTC or prior to starting the installation of the device, utilities can be inserted through the FTC and SCPS.

18 Claims, 4 Drawing Sheets (58) Field of Classification Search
USPC ....... 52/58, 60, 62, 97, 219, 244; 285/42, 43
See application file for complete search history.

(56) References Cited

U.S. PATENT DOCUMENTS

| | | | | |
|---|---|---|---|---|
| 1,683,548 A * | 9/1928 | Hughey | .............. | E04D 13/1476 285/43 |
| 1,750,019 A * | 3/1930 | Moore | ................ | E04D 13/1476 285/47 |
| 1,883,508 A * | 10/1932 | Bonday | ............... | E04D 13/1471 248/536 |
| 3,797,181 A * | 3/1974 | Nievelt | ................... | E04F 17/04 52/105 |
| 4,223,486 A * | 9/1980 | Kelly | ...................... | E04D 13/17 52/1 |
| 4,512,119 A * | 4/1985 | Willoughby | ........ | E04D 13/1476 285/43 |
| 4,557,081 A * | 12/1985 | Kelly | ........................ | E04D 5/14 52/199 |
| 4,706,418 A * | 11/1987 | Stewart | ................... | E04D 13/17 405/43 |
| 4,937,991 A * | 7/1990 | Orth | .................... | E04D 13/1407 138/157 |
| 5,211,428 A * | 5/1993 | Emerson | ................... | F16L 5/10 285/141.1 |
| 5,347,776 A * | 9/1994 | Skoff | .................. | E04D 13/1476 52/199 |
| 5,390,451 A * | 2/1995 | Kopp | .................. | E04D 13/1471 285/43 |
| 5,647,178 A * | 7/1997 | Cline | .................. | E04D 13/1476 285/43 |
| 7,682,675 B2 * | 3/2010 | Boge | .......................... | C09J 7/20 428/40.1 |
| 8,291,658 B1 * | 10/2012 | Johnston | ............. | E04D 13/1471 52/219 |
| 8,490,351 B1 * | 7/2013 | Scott | .................... | E04D 13/1476 52/219 |
| 9,328,514 B1 * | 5/2016 | Thompson | ............ | E04D 13/143 |
| 2007/0087624 A1 * | 4/2007 | Edwards | ............. | E04D 13/1476 439/559 |
| 2008/0124506 A1 * | 5/2008 | Boge | ........................ | F16L 5/02 428/36.6 |
| 2011/0000154 A1 * | 1/2011 | Cline | ....................... | F16J 3/041 52/219 |
| 2012/0090263 A1 * | 4/2012 | Schaefer | ............. | E04D 13/1476 52/741.4 |
| 2015/0267413 A1 * | 9/2015 | Hull | .................... | E04D 13/1476 52/58 |
| 2017/0261145 A1 * | 9/2017 | Vargas | .................. | H01L 31/042 |

FOREIGN PATENT DOCUMENTS

| | | | | |
|---|---|---|---|---|
| EP | 0893552 A1 | | 1/1999 | |
| EP | 2492411 A2 * | | 8/2012 | .............. E04D 1/30 |
| EP | 2492411 A2 | | 8/2012 | |
| GB | 2496056 A * | | 5/2013 | ............... F16L 5/00 |
| KR | 20110134154 A * | | 12/2011 | |

OTHER PUBLICATIONS

International Search Report and Written Opinion from International Application No. PCT/IL2017/000003 dated Aug. 31, 2017.

* cited by examiner

DEVICE FOR PROTECTING OF PASSAGES FOR UTILITIES FROM ENTRY OF OUTDOOR WEATHER ELEMENTS OF ADVERSE EFFECTS

FIELD OF THE INVENTION

The present invention relates to a device for protecting of passages for utilities from entry through of outdoor weather elements of adverse effects. More specifically, the present invention relates to an easy and simple-to-install device, for protecting of passages for utilities in rigid-material roof structures from entry through of outdoor weather elements of adverse effects. The term "utilities" refers in the present invention to, but not limited only to, wires, tubes and ropes.

BACKGROUND OF THE INVENTION

The term "utilities" is defined by the Merriam Webster Dictionary (website: https://www.merriam-webster.com/dictionary/utilities) as: "something useful or designed for use". The term "surface" is defined by the same dictionary as: "the exterior or upper boundary of an object or body". In reference to the present invention, the term "utilities" refers to elongated household service-providing objects such as but not limited to: electrical wires, communication cables, water tubes, gas tubes and vent channels, that typically run through roof structures. The mentioned elongated household service-providing objects typically have flexible or semi-flexible characteristics, thus, the elongated objects can be inserted into pre-curved-structured tubes in which they obtain the curvature of the tubes. Alternatively, the elongated household service-providing objects, can be inserted into upright (straight, un-curved) flexible tubes and the flexible tubes together with the inserted elongated objects can be bended to a desired bent configuration. The curvature of the flexible tubes of the present invention, as explained later in the text, is typically to an inverted U configuration.

The term "roof structure" reference to in the present text to a cover of a building constructed of a rigid-material or materials such as, but not limited to: concreate casts, metallic material sheets, plastic-material sheets, ceramic roof-tiles, wooden plates and asbestos plates, having a substantially flat and smooth external, outdoors-exposed, surface side.

A "passage for utilities" is defined in the present text to be a free-passage opening in a roof structure, typically a drilled hole-opening or casted-through opening, that runs from the external surface to its internal surface and serves for the passage of the utilities.

The term "outdoor weather elements" refers in the present text to mean outdoor environmental factors such as, but not limited to: rain-water, snow-melt, hail-melt, win blown dust particles, sand particles and dry leaves, that a roof structure is typically meant to prevent from entering the roof-structure covered space, due to their potential to cause damages. If the roof structure fails in the prevention of entry, uncomfortable conditions and/or damages may result to persons and/or property beneath the roof structure, thus, the use of the term "adverse effects" that could be caused by exposure to "outdoor weather elements" if entry through passage for utilities is made possible.

The term "bitumen" is defined by the Free Dictionary (website: http://www.thefreedictionary.com/bitumen) as" "any of various flammable mixtures of relatively nonvolatile hydrocarbons that occur naturally or are obtained by fractional distillation of petroleum. Bitumens are used for paving, roofing, and waterproofing. Also called asphalt."

The terms "fixated" and "firmly connected" and the terms "Fig." and "figures", respectively, are used interchangeably in the text.

A passage for utilities in roof structures is an opening through which outdoor weather elements causing adverse effects may enter a building, thus, the desire for devices that will enable the insertion of utilities through utility passages while preventing the entry to the passages and from the passages to buildings of outdoor weather elements of adverse effects. The term "protecting" refers to preventing the entry of the outdoor weather elements from the external roof structure surfaces into utility passages.

Various devices for the protecting of passages of utilities from entry of outdoor weather elements of adverse effects as well as how to connect such devices to the outer surface of roof structures have previously been disclosed. Some prior art publications of devices and roof-connection methods of such devices are quoted below:

U.S. Pat. No. 5,347,776 (Skoff) presents a flexible roof vent sealing system which includes a base section having a base plate and a tubular connecting member extending from the base plate and a plurality of separable sealing sections which couple to the tubular connecting member of the base section. Each sealing section includes a flexible, corrugated tubular body with a sealing portion at one end to seal against a roof vent pipe and a coupling portion at the other end of the tubular body which couples to the tubular connecting member of the base section.

U.S. Pat. No. 7,682,675 (Boge et al.) presents the use of a self-adhesive flexible sealing tape, especially on a butyl or acrylic base, possibly a butyl rubber base, intended for sealing purposes and so designed that both the sealing tape and the carrier foil applied to the sealing tape are capable of being stretched, thus enabling the carrier tape to follow the stretching state of the sealing tape.

EP0893552 (Favero) presents an invention that relates to a fastening system for various accessories or couplings used in waterproof coverings. The flanges of the various accessories such as unions, ventilation openings, angular elements etc. are provided with through holes ensuring the adhesion between the sheathing positioned under the flange and the upper sheathing/s. In this way the coupling is incorporated between the two sheathings and cannot come off.

EP2492411 (Hilpert et al.) presents a ventilation device that has a roofing plate to which a mandrel is connected. The mandrel is swingable with respect to a roof pitch hood. An air outlet opening is provided at upper tube section of ventilation pipe that is mounted in roof pitch hood. An air inlet opening is provided at lower tube section of pipe. A flexible section is provided between upper tube section and lower tube section. A connection element is arranged at lower tube section of pipe and is arranged perpendicular with respect to a rafter provided on a roof substructure.

The present invention is a device for protecting of passages for utilities in roof structures from the entry of outdoor weather elements of adverse effects, that is reliable yet substantially easier and quick to install, then the disclosed devices disclosed.

SUMMARY OF THE INVENTION

The present invention is a reliable and simple to install device for protecting of passages for utilities in roof structures from the entry of adverse effect outdoor weather elements. The device is composed of:

a flexible tube component (FTC), a surface insertion tube component (SITC), a surface connection plate component (SCPC) and a SCPC-connecting paste component.

FTC is composed of a hollow, semi-flexible tube having one side unconnected and the other side firmly connected to the SITC, forming a continuous tube. The term "semi-flexible tube" refers to a tube that can bend from an upright, vertical configuration to a curved configuration, when at least a moderate manual force is applied to the tube. The "moderate manual-force" means moderate pushing and/or pulling force applied by a typical single healthy adult person. The tube does not change its bended configuration as long as no manual force is applied to un-bend the tube. The SITC is composed of a rigid hollow tube divided into two portions by the SCPC. The SCPS is composed of a perforated, rigid material, perpendicularly fixated to and around the SITC, In installing the device of the present invention, the SCPC-connecting paste component is smeared on the external surface of a roof structure surrounding the passage for utilities. The unconnected side of SITC is inserted into the passage for utilities till the SCPC is tightly pressed into the SCPC-connecting paste component. The SCP is pressed until the SCPC-connecting paste component oozes through the perforated plate of the SCPC. Upon drying and hardening of the SCPS connecting paste component, the SCPS is fixated and the device is stabilized. After the device is fixed and stabilized the FTC is stretched and bent in an approximately 180 degree angle, bestowing an inverted U configuration to the tube, so as to have the unconnected opening of the FTC approximately aligned in parallel with, and facing the external surface of, the roof structure surrounding the passage for utilities. Either after the bending of FTC or prior to the installation of the device, utilities can be inserted through the FTC and SCPS.

By having opening of FTC "facing down" towards the external surface of the roof structure prevent the sipping through the tube of water (from coming from the sky of rain, snow and hail). The inverted U configuration of hollow tube of FTC and SCPS, block the direct sedimentation of particles into the passage for utilities. Thus, by the "facing down" of opening of FTC and the curvature of hollow tube of FTC and SCPS, the device of the present invention protect passages for utilities in roof structures from the entry of adverse effect outdoor weather elements.

Alternatively to being separate entities, the FTC and SITC of the device of the present invention may be produced as a single entity.

The SCPC-connecting paste component of the device of the present invention is typically, but not limited to be, a bitumen paste. Alternatively, and not limited to be, the SCPC-connecting paste component can be either an acryl based sealant or a silicone based sealant glue paste Components FTC, SITC and SCPS may be made of plastic or metallic materials.

The SITC plate, perpendicularly fixated to and around SITC, of the device of the present invention typically has, but not restricted to having, a round configuration.

BRIEF DESCRIPTION OF THE DRAWINGS

In order to better understand the present invention, and appreciate its practical applications, the following Figures are provided and referenced hereafter. It should be noted that the Figures are given as examples only and in no way limit the scope of the invention. Like components are denoted by like reference numerals.

DETAILED DESCRIPTION OF A PREFERRED EMBODIMENT

A passage for utilities in roof structures is an opening through which outdoor weather elements of adverse effects could enter a building. The present invention is a reliable and easy to install device (10) for protecting passages from the entering of the outdoor weather elements into the passages.

The device of the present invention has no moving mechanical element, thus, does not require maintenance. Since there are no moving parts and the entry to the device (which is the gate way to the passages for utilities) is through a fixated in place opening facing the external surface of the roof-structure (as explained further on in the text), the device of the present invention is reliable in the sense that no mechanical breakdown can occur. The device is easy and simple to install (as explained further on in the text) and can be adjusted to a suitable diameter for the insertion of various utilities. Installing can be done within a short time period (typically a few minutes) and requires no welding. No experience or/and technical-education in building or plumbing is required to do the installing of the device.

Figure 1:
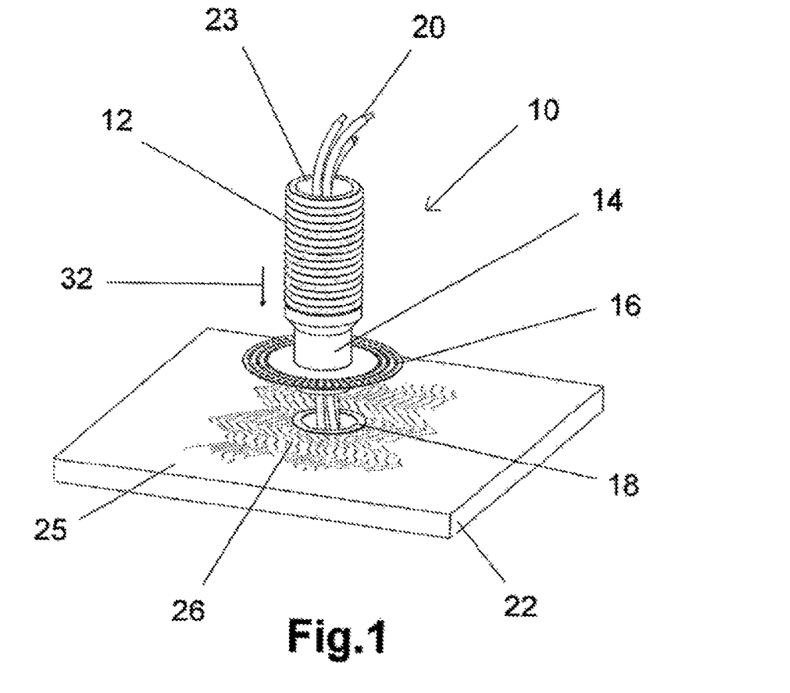
FIG. 1 is an isometric, view from the side and above, illustration of a device of the present invention, for protecting of passages for utilities from entry of outdoor weather elements of adverse effects, in the process of being inserted into a passage for utilities with a connecting paste component smeared on the surface surrounding a passage for utilities.

The device (10) of the present invention is constructed of three joint-together components: a flexible tube component (12) abbreviated as: FTC, a surface insertion tube component (14), abbreviated as: SITC and a surface connection plate component (16) abbreviated as: SCPC. The three joint components are illustrated in FIG. 1 and in FIG. 2.

Figure 3:
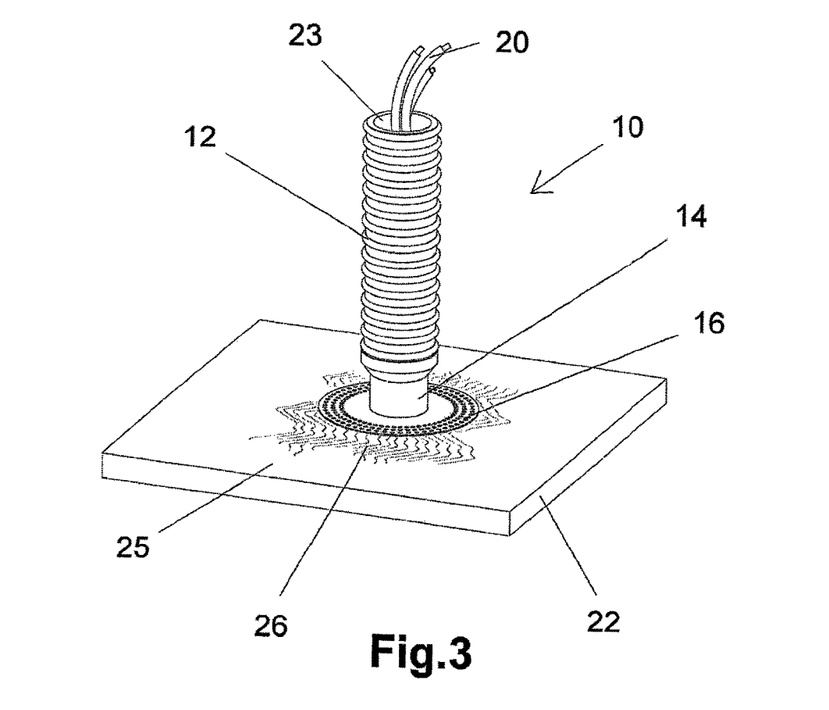
FIG. 3 is an isometric, view from the side and above, illustration of the device in FIG. 1 inserted into a passage for utilities, with its flexible tube in an upright and stretched configuration and the connecting paste component in connection with the surface connection plate component (SCPC) of the device.
Figure 5:
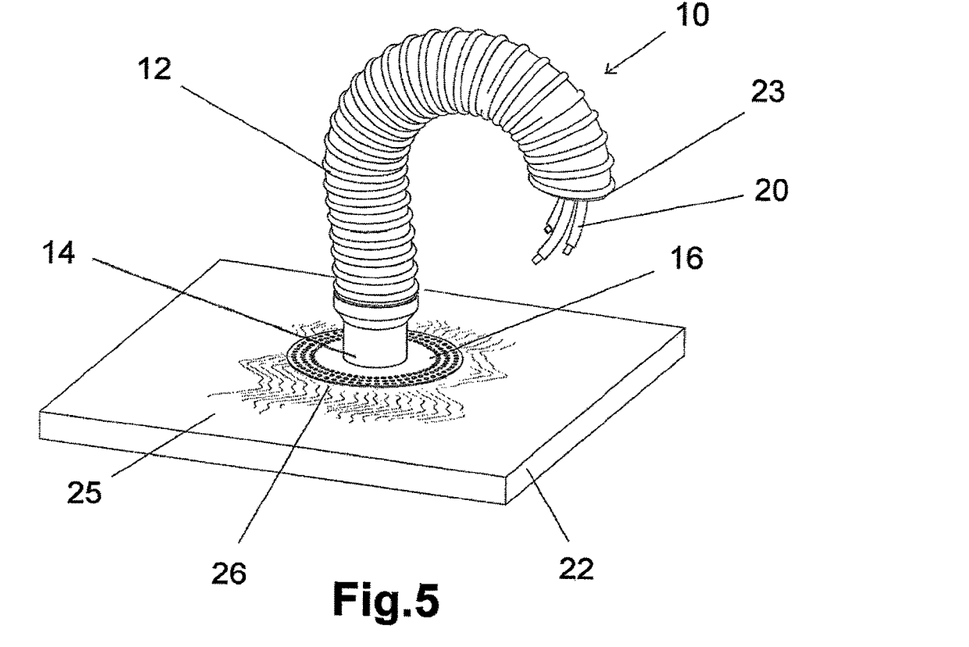
FIG. 5 is an isometric, view from the side and above, illustration of the device in FIG. 1 inserted into a passage for utilities, with its flexible tube in a bent and stretched configuration.

Device (10) is fixated to the external surface of a roof structure surrounding the passage for utilities by a SCPC-connecting paste component that irreversibly hardens upon drying. Typically, but not limited to, the SCPC-connecting paste component is bitumen paste. Smearing of the SCPC-connecting paste component on the external surface of a roof structure surrounding the passage for utilities is illustrated in FIGS. 1,3 and 5.

The FTC (12) is composed of a hollow semi-flexible tube having one side unconnected (23) and the other side firmly connected to SITC (14). FTC (12) and SITC (14) form, when connected, a continues continuous tube. The term "semi-flexible" refers to the characteristics of the tube, so as to be stretchable and bendable to an approximate 180-angle without the collapse of hollow tube and the maintaining the bended configuration after being bent. The term "semi-flexible tube" also refers to the bending characteristics of the tube, meaning that the tube can bend from an upright, vertical configuration to a curved configuration, when at least moderate manual force is applied to the tub, the term "moderate manual-force" means moderate pushing and/or pulling force applied by a typical single healthy adult person. The tube does not change its bended configuration as long as no manual force is applied to un-bend it.

Figure 6:
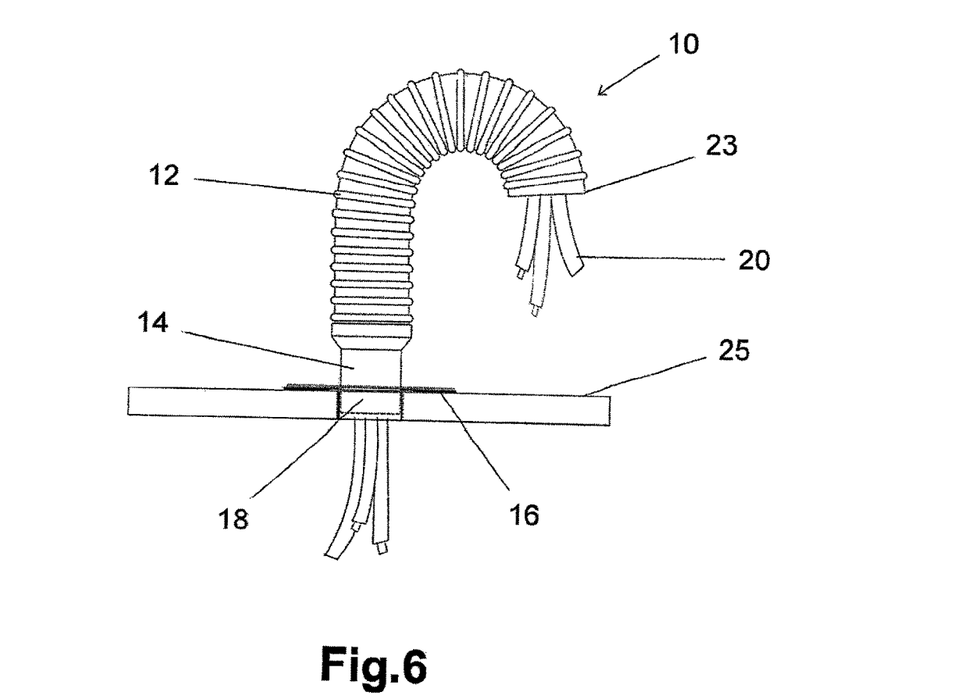
FIG. 6 is a schematic, view from the side, illustration of the device in FIG. 1, inserted into a passage for utilities, with its flexible tube in a bent and stretched configuration.

The tube of FTC (12) is typically composed of, but not limited to, a flexible a ribbed-structured tube, made of rigid rings connected between them by a semi-flexible material. The flexibility of the connection between the rings enables the changing of the spatial configuration of the tube; enabling the stretching and retracting as well as bending the tube to an inverted U configuration. The rigid rings prevent the inward collapse of the hollow tube. Tube (12) is typically made from, but not limited to, outdoor environmental-resistant metallic or plastic materials. When component (12) is bent in an inverted U configuration, the unconnected opened side (23) is bent from an approximate upright position relative to the roof external surface (25) to a configuration in which the opening in the unconnected side (23) is approximately aligned in parallel with roof surface (25), with the opening facing the surface. An illustration of a bent FCT (12) is shown in FIG. 5 and FIG. 6. Once FTC (12) is bent with its opening (23) facing the roof surface (25) it does not readily return to its upright configuration. The inner diameter of the FTC (12) and/or its unconnected opening (23) can be chosen to be of different and suitable measurements. The chosen diameter should enable the easy passage of the utilities (20) through FTC (12) while preventing the free movements of the utilities (20) from side to side in FTC (12). The chosen diameter should also reduce to a minimum the opening area (23) exposed to the external roof structure surface (25), thus reducing the risk of entry of outdoor weather elements of adverse effects.

SITC (14) is composed of a rigid hollow tube, typically made of, but not limited to, plastic or metallic materials, that is divided into two portions by the SCPC (16). The end of one portion of tube SITC (14) remains unconnected and has a diameter which fits into the passage for utilities hole (18) in roof structure (22). At the other end of component (14) is a ring structure (designated (24), shown in FIG. 8) which fits to hug the end section of tube FTC (12) and firmly connects with it. The two joint hollow tubes ((12) and (14)) connect to form a continuous tube through which utilities (20) are inserted. SCPC (16) surrounds and is fixated to SITC (14) between the two portions of component (14).

SCPC (16) is composed of a plate, typically, but not necessarily, having a round configuration, made of rigid material, typically, but not limited to, metal or plastic materials. Plate (16) is perforated and perpendicularly connected and fixated to and around SITC (14). In the preferred embodiment of the present invention, presented in the figures, plate (16) has a solid (not perforated) section, typically a ring shaped section, surrounding the close vicinity of tube (14) and has a perforated section, typically a ring shaped section, surrounding the solid section (see (28) and (30) in FIGS. 7 and 8).

The SCPC-connecting paste component (26) is a sticky paste substance, such as, but not limited to, bitumen paste, that irreversibly hardens upon drying. In installing device (10) on an external surface (25) of a roof structure (22), smeared SCPC-connecting paste component (26) oozes through the perforated plate of SCPC (16) from the surface (25) and fixates the plate in place upon hardening.

Figure 2:
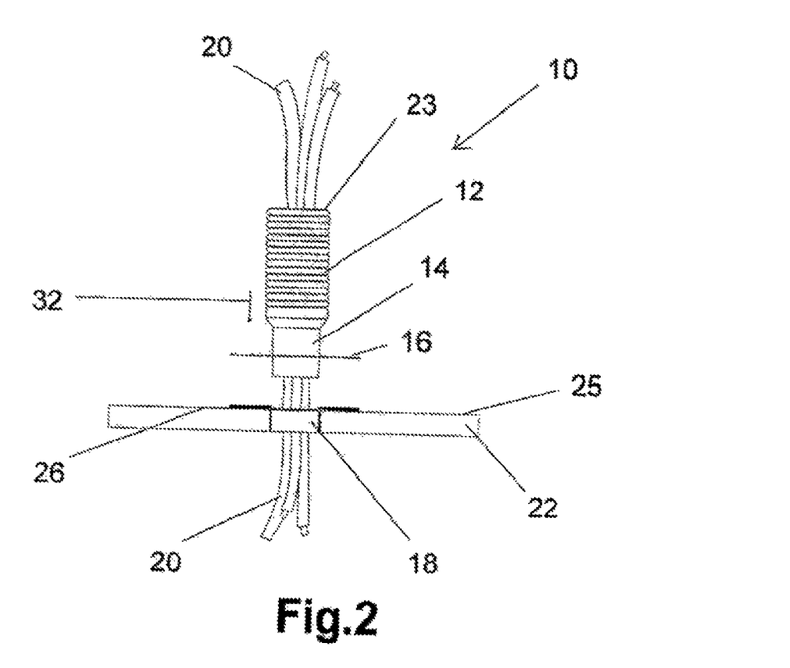
FIG. 2 is a schematic, view from the side, illustration of the device in FIG. 1, in the process of being inserted into a passage for utilities.
Figure 4:
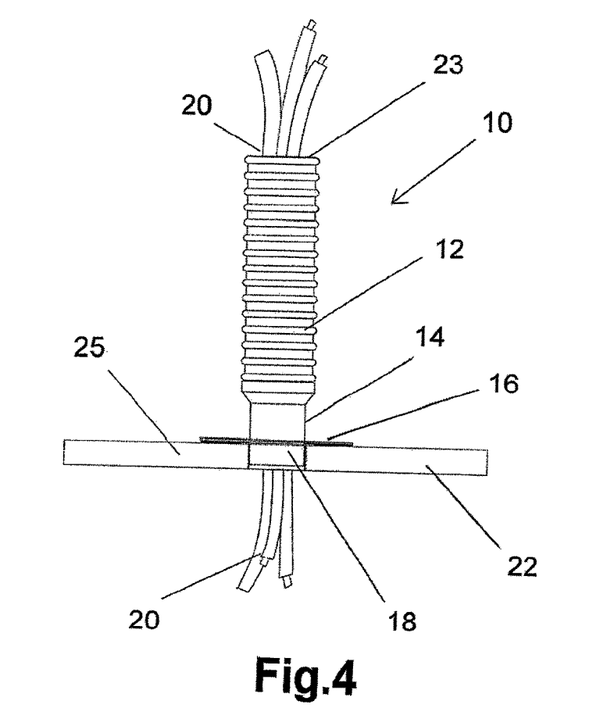
FIG. 4 is a schematic, view from the side, illustration of the device in FIG. 1, inserted into a passage for utilities, with its flexible tube in an upright and stretched configuration.

Reference is presently made to FIGS. 1 to 6:

FIGS. 1, 3 and 5, should be seen in a sequence. FIGS. 2, 4 and 6 should also be seen in a sequence and in parallel with FIGS. 1, 3 and 5.

FIGS. 1, 3, and 5 are isometric, view from the side and above, illustrations of the device (10) of the present invention, in the process of being installed. From another point of view: FIGS. 2, 4 and 6 are schematic, view from the side, illustrations of device (10) of the present invention in the process of being installed.

In the all the FIGS. 1 to 6, utilities, designated (20), are shown inserted into device (10).

FIG. 1 and FIG. 2 illustrate the device (10) of the present invention in the process of being inserted into a passage for utilities (18) in a roof structure (22).

In the process, around the passage for utilities (18), on the external surface (25) of roof structure (22), a layer of bitumen paste (also referred to as: bitumen sealing tar) is applied (designated: 26)). The unconnected end portion of SITC (14) is inserted into passage for utilities (18) in roof structure (22) till the plate of SCPC (16) comes into contact with the surface (25) of roof structure (22). The plate is pressed vigorously towards surface (25), causing the squeezed bitumen paste to ooze through the holes of the perforated of the plate SCPC (16). Upon drying and hardening, the bitumen paste firmly fixates in place the plate of SCPC (16) to the surface (25) of roof structure (22), thus, fixing in place and stabilizing the SITC (14) which has the FTC (12) connected to it. The drying and hardening of the bitumen paste also seals the gap between the inserted SITC (14) and the wall and the passage for utilities (18). Arrow (32) indicates the direction of movement of SITC (14) into the passage for utilities (18). The external diameter of SITC (14) is designed to be such that it fits with ease into the passage of utilities (18) yet the distance between the wall of the inserted SITC (14) and the wall of the passage of utilities (18) is calculated to be minimal, typically a few millimeters.

FIG. 3 and FIG. 4 illustrate the device (10) fixated in the passage for utilities (18) in roof structure (22). The FTC (12) is shown in the figures in a stretched and upright configuration.

FIG. 5 and FIG. 6 illustrate the device (10) fixated in the passage for utilities (18) in roof structure (22) and the stretched, FTC (12) is shown in the figures in a bent, in a inverted U configuration, in which the unconnected opening (23) is approximately fixated in a configuration of being approximately aligned in parallel with, and facing the roof surface (25). In the bent configuration, undesired outdoor weather elements, are prevented from readily entering the unconnected opening (23), thus, the entry to the passage for utilities (18) in roof structure (22) is protected.

The application of the layer of bitumen paste (26), the insertion of SITC (14) into the passage for utilities (18) and the bending to an inverted U configuration of FTC (12) are simple and easy to implement activities, thus, device (10) is simple to install.

Figure 7:
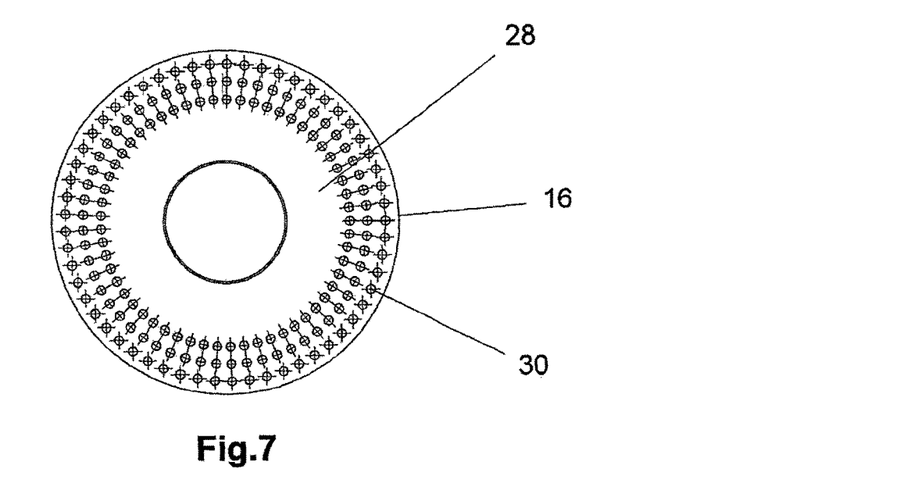
FIG. 7 is a schematic, view from the top, illustration of the surface connection plate component (SCPC) of the device illustrated in FIG. 1.
Figure 8:
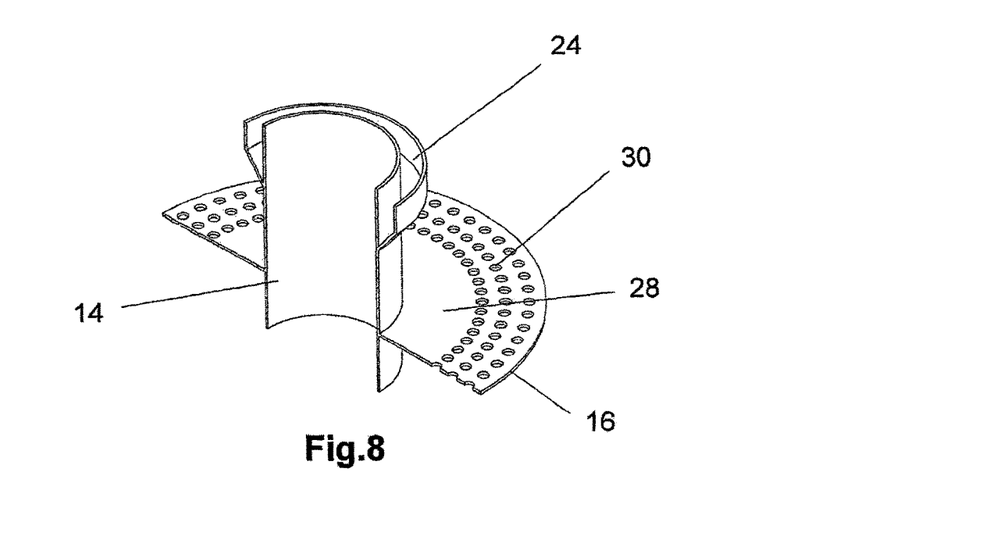
FIG. 8 is an isometric crosscut view from the side and above, illustration of the surface connection plate component (SCPC) and the surface insertion tube component (SITC) of the device illustrated in FIG. 1.
Figure 9:
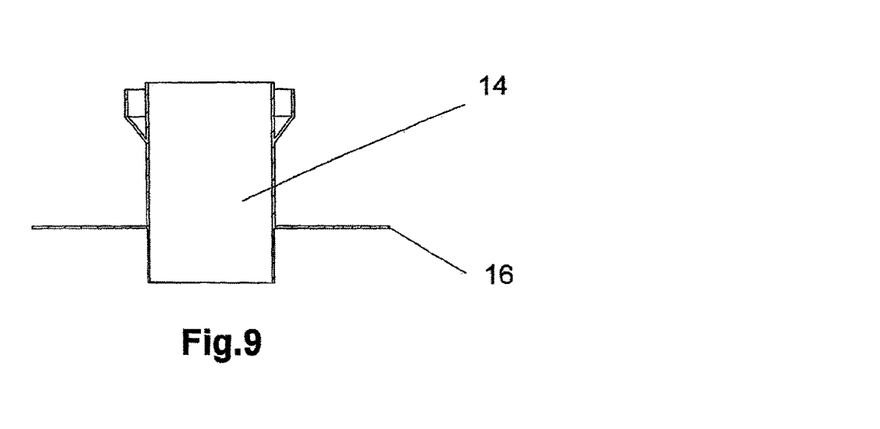
FIG. 9 is a schematic crosscut, view from the side, illustration of the surface connection plate component (SCPC) and the surface insertion tube component (SITC) of the device illustrated in FIG. 1.

Reference is presently made to FIGS. 7 to 9 in order to further explain the structure of plate SCPC (16) and SITC (14).

FIG. 7 is a schematic, view from the top, illustration of the SCPC (16) and SITC (14) of device (10). The line marked in the figure as: A-A designates the crosscut of the two components, illustrated in FIG. 8 and FIG. 9. FIG. 8 is an isometric crosscut view from the side and above, illustration of the SCPC (16) and SITC (14) of device (10). In the figure the solid (not perforated) ring surrounding the close vicinity of tube (14) and the perforated ring surrounding the solid ring (designated (28) and (30)), respectively, are shown. Also shown in the figure is the ring structure (24) at the end of component (14) which fits into tube FTC (12) and firmly connects with it.

FIG. 9 is a schematic crosscut, view from the side, illustration of the SCPC (16) and SITC (14) of the device.

The device (10) of the present invention for protecting of passages for utilities from entry of outdoor weather elements of adverse effects in roof structures can be produced with the SITC (14) and the FTC (12) as a single, connected, entity. Alternatively, components (14) and (16) can be produced as separate entities which are firmly connected when device (10) is installed.

It should be clear that the description of the embodiments and attached Figures set forth in this specification serves only for a better understanding of the invention, without limiting its scope.

It should also be clear that a person skilled in the art, after reading the present specification could make adjustments or amendments to the attached Figures and above described embodiments that would still be covered by the present invention.

I claim:

1. A kit for protecting of a passage for utilities from entry of outdoor weather elements of adverse effects comprising:
    a device including a flexible tube, a surface insertion tube, and a surface connection plate; and
    a paste configured to secure to the surface connection plate,
    wherein:
    said flexible tube comprising a hollow flexible tube having one side with an unconnected opening and the other side firmly connected to said surface insertion tube, forming a continuous tube,
    said surface insertion tube comprising a rigid hollow tube divided into two portions by said surface connection plate and including at least an unconnected side distal to the flexible tube,
    said surface connection plate comprises a rigid material having a plurality of perforations and perpendicularly fixated to and around said surface insertion tube,
    wherein, said paste is configured to be smeared on an external surface of a roof structure surrounding said passage for utilities,
    said unconnected side of said surface insertion tube is sized and dimensioned to be inserted into said passage for utilities,
    the plurality of perforations on said surface connection plate are sized such that when the surface connection plate is tightly pressed into said paste smeared onto the external surface of a roof structure, said paste oozes through the plurality of perforations of said surface connection plate,
    said surface connection plate is configured to be fixated upon drying and hardening of said paste,
    said flexible tube is configured to stretch and bend from an upright configuration to a curved configuration having an approximately 180 degree angle so as to have said unconnected opening of said flexible tube approximately aligned in parallel with, and facing the external surface of the roof structure surrounding said passage for utilities.

2. The kit of claim 1, wherein the flexible tube and the surface insertion tube are produced as a single entity.

3. The kit of claim 1, wherein the surface insertion tube and the surface connection plate are produced as a single entity.

4. The kit of claim 1, wherein the paste is bitumen paste.

5. The kit of claim 1, wherein the paste is an acrylic based sealant paste.

6. The kit of claim 1, wherein the paste is a silicone based sealant paste.

7. The kit of claim 1, wherein the flexible tube is made of metallic materials.

8. The kit of claim 1, wherein the flexible tube is made of plastic materials.

9. The kit of claim 1, wherein the surface insertion tube is made of metallic materials.

10. The kit of claim 1, wherein the surface insertion tube is made of plastic materials.

11. The kit of claim 1, wherein the surface connection plate is made of metallic materials.

12. The kit of claim 1, wherein the surface connection plate is made of plastic materials.

13. The kit of claim 1, wherein the surface connection plate has a round shape configuration.

14. The kit of claim 1, wherein the flexible tube includes a ribbed-structured tube.

15. The kit of claim 14, wherein the flexible tube includes a plurality of rigid rings connected by a flexible material such that the flexible tube is configured to selectively stretch and retract.

16. A device for protecting of a passage for utilities from entry of outdoor weather elements of adverse effects, the device comprising:
    a hollow, flexible tube comprising having a first end region with an unconnected, open end and a second end region distal to the first end region, the flexible tube having a ribbed-structure and configured to selectively stretch and bend from an upright configuration to a curved configuration having an approximately 180 degree angle so as to have the unconnected open end approximately aligned in parallel with and facing an external surface of a roof structure surrounding a passage for utilities;
    a hollow, rigid surface insertion tube having a first portion connected to the second end region of the flexible tube and an unconnected second portion distal to the first portion of the surface insertion tube and sized and dimensioned to be inserted into the passage for utilities on the roof structure, the surface insertion tube and the flexible tube forming a continuous channel through the surface insertion tube and the flexible tube; and
    a rigid surface connection plate positioned substantially perpendicularly and around the surface insertion tube between the first portion and the second portion of the surface insertion tube, the surface connection plate having a plurality of perforations sized for passage of a paste therethrough when the surface connection plate is pressed into the paste smeared around the passage for utilities on the external surface of the roof structure to fixate the surface connection plate on the external roof structure when the paste dries and hardens.

17. The device of claim 16, wherein the flexible tube includes a plurality of rigid rings connected by a flexible material such that the tube is configured to stretch and retract.

18. The device of claim 16, wherein the surface insertion tube and at least one of the flexible tube or the surface connection plate are formed as a single entity.

\* \* \* \* \*